United States Patent [19]

Sasaki

[11] Patent Number: 5,675,783
[45] Date of Patent: Oct. 7, 1997

[54] CD-ROM XA DATA DISC FEATURING DISPLAY POSITION DATA RECORDED THEREON

[75] Inventor: Norimasa Sasaki, Saitama, Japan

[73] Assignee: Sony Corporation, Tokyo, Japan

[21] Appl. No.: 436,873

[22] Filed: May 8, 1995

Related U.S. Application Data

[63] Continuation of Ser. No. 794,935, Nov. 21, 1991, abandoned.

[30] Foreign Application Priority Data

Nov. 28, 1990 [JP] Japan ................................ 2-322687

[51] Int. Cl.$^6$ ............................................. G06F 17/30
[52] U.S. Cl. ............................................ 395/611; 395/615
[58] Field of Search ...................... 395/600, 152, 395/615; 364/410, 875.1; 345/157

[56] References Cited

U.S. PATENT DOCUMENTS

| | | | |
|---|---|---|---|
| Re. 30,666 | 7/1981 | Mitchell et al. | 434/307 R |
| 4,124,943 | 11/1978 | Mitchell et al. | 434/307 R |
| 4,357,635 | 11/1982 | Hasegawa | 360/51 |
| 4,649,380 | 3/1987 | Penna | 340/721 |
| 4,779,080 | 10/1988 | Coughlin et al. | 364/200 |
| 5,019,816 | 5/1991 | Hosono | 341/77 |
| 5,107,343 | 4/1992 | Kawai | 358/341 |
| 5,151,975 | 9/1992 | Shiraki et al. | 395/148 |
| 5,355,472 | 10/1994 | Tomathom | 395/600 |

OTHER PUBLICATIONS

Clair Whitmer, "Phillips, Sony, Microsoft Team to Develop CD-ROMXA", MacWeek, vol. 2, No. 38, Sep. 20, 1988, p. 5 Sep. 1988.

Russ Lockwood, "Size Up CD-ROM", Personal Computing, vol. 14,No. 7, Jul. 1990, pp. 70-76 Jul. 1990.

*Primary Examiner*—Thomas G. Black
*Assistant Examiner*—Paul R. Lintz
*Attorney, Agent, or Firm*—Limbach & Limbach L.L.P.

[57] ABSTRACT

A data disc, on which there are recorded main text data including map data for displaying a picture, map data pointer information as pointer information for the map data, item data for retrieving the main text data, display position data indicating the display position of the item data on a display screen, and address data for reading out data corresponding to different items. The data disc is reproduced so that the map data are read out from the disc at the same time that the item data are displayed in superimposition on the display screen at a position indicated by the display position data of the read-out map data, and output data corresponding to the item data are read out from the main text data on the basis of the address data for unifying the data recording format and retrieval method to enable reciprocal retrieval of the letter data, map data and voice data.

27 Claims, 9 Drawing Sheets

| LEVEL | SAMPLING | | DYNAMIC RANGE | MODE | PLAYBACK TIME (MAX.) |
|---|---|---|---|---|---|
| CD-DA | 16bit | 20.0KHz | 98db | STEREO | 1hr |
| LEVEL B | 4bit | 17.0KHz | 98db | STEREO | 4hrs |
|  |  |  |  | MONAURAL | 8hrs |
| LEVEL C | 4bit | 8.5KHz | 98db | STEREO | 8hrs |
|  |  |  |  | MONAURAL | 16hrs |

FIG.1 (PRIOR ART)

| SECTOR / LEVEL | 0 | 1 | 2 | 3 | 4 | 5 | 6 | 7 | 8 | 9 | 10 | 11 | 12 | 13 | 14 | 15 | 16 | 17 | ... |
|---|---|---|---|---|---|---|---|---|---|---|---|---|---|---|---|---|---|---|---|
| LEVEL B STEREO 1:3 | A | X | X | X | A | X | X | X | A | X | X | X | A | X | X | X | A | X | ... |
| LEVEL B MONAURAL 1:7 | A | X | X | X | X | X | X | X | A | X | X | X | X | X | X | X | A | X | ... |
| LEVEL C STEREO 1:7 | A | X | X | X | X | X | X | X | A | X | X | X | X | X | X | X | A | X | ... |
| LEVEL C STEREO 1:15 | A | X | X | X | X | X | X | X | X | X | X | X | X | X | X | X | A | X | ... |

FIG.2 (PRIOR ART)

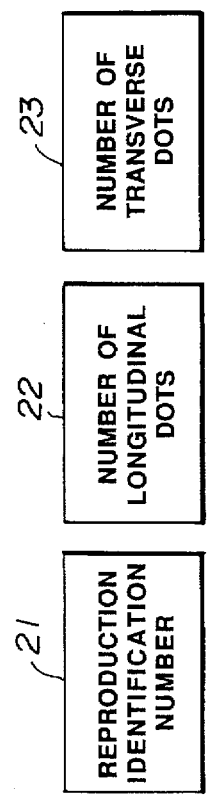

FIG.4

| ENTRIES | | | | | | RESERVE (14 BYTES) |
|---|---|---|---|---|---|---|
| REPRODUCTION IDENTIFICATION NUMBERS | DATA TYPE | COMPRESSION METHODS | LONGITUDINAL SCREEN SIZE | TRANSVERSE SCREEN SIZE | RESOLUTION (LONGITUDINAL) | RESOLUTION (TRANSVERSE) | RESERVE (4 BYTES) |
| REPRODUCTION IDENTIFICATION NUMBERS | DATA TYPE | COMPRESSION METHODS | LONGITUDINAL SCREEN SIZE | TRANSVERSE SCREEN SIZE | RESOLUTION (LONGITUDINAL) | RESOLUTION (TRANSVERSE) | RESERVE (4 BYTES) |
| ---- | ---- | ---- | ---- | ---- | ---- | ---- | ---- |
| REPRODUCTION IDENTIFICATION NUMBERS | DATA TYPE | COMPRESSION METHODS | LONGITUDINAL SCREEN SIZE | TRANSVERSE SCREEN SIZE | RESOLUTION (LONGITUDINAL) | RESOLUTION (TRANSVERSE) | RESERVE (4 BYTES) |

FIG.5

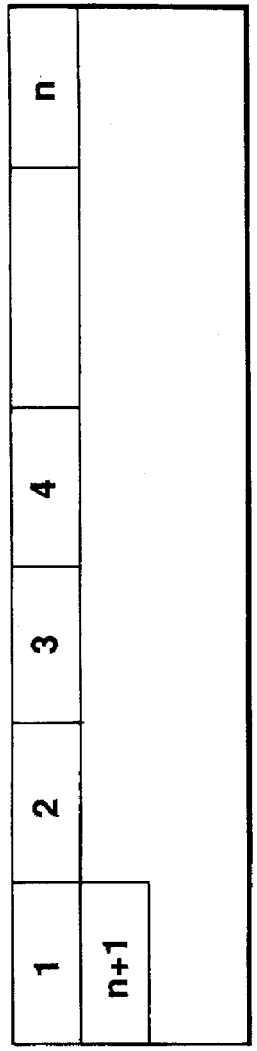
BIT MAP IMAGE
FIG. 6
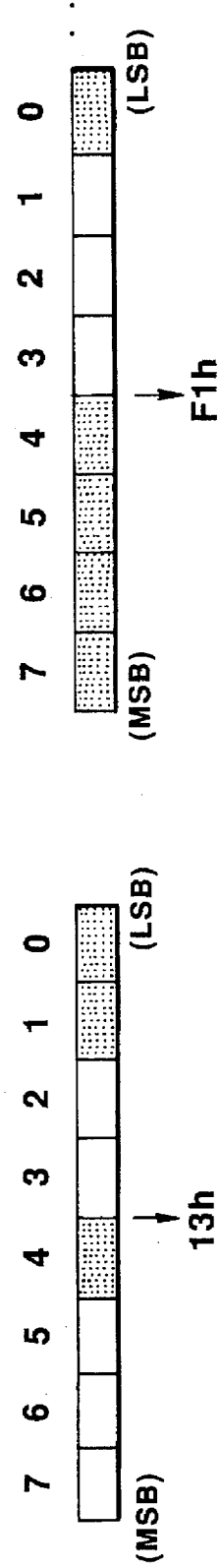
FIG. 7A
FIG. 7B

| DATA GROUP CONTROL BLOCK START CODE (1F45) | | | | |
|---|---|---|---|---|
| VOICE DATA POINTER INFORMATION START CODE (1F48) | ICON INDICATING POSITION | VOICE DATA NAME | VOICE DATA POINTER INFORMATION END CODE (1F68) | ADDRESS DATA | LINE FEED (1F0A) |
| MAP MENU DATA POINTER INFORMATION START CODE (1F46) | ICON INDICATING POSITION | NAME OF NEXT MAP | MAP MENU DATA POINTER INFORMATION END IDENTIFIER (1F66) | ADDRESS DATA | LINE FEED (1F0A) |
| --- | --- | --- | --- | --- | --- |
| DATA POINTER INFORMATION START CODE FOR REFERENCE TO OTHER ITEMS (1F46) | ICON INDICATING POSITION | NAME OF REFERENCE SENTENCES | DATA POINTER INFORMATION START CODE FOR REFERENCE TO OTHER ITEMS (1F46) | ADDRESS DATA | LINE FEED (1F0A) |
| DATA GROUP CONTROL BLOCK END CODE (1F65) | | | | | |

| 90 | | | | |
|---|---|---|---|---|
| DATA GROUP CONTROL BLOCK START CODE (1F45) | | | | |
| 91 — MAP DATA POINTER INFORMATION START CODE (1F44) | DATA FOR MAP REPRODUCTION | | MAP CITIES OF AMERICA | MAP DATA POINTER INFORMATION END CODE (1F64) |
| 92 — DATA POINTER INFORMATION START CODE FOR REFERENCE TO OTHER ITEMS (1F42) | ICON INDICATING POSITION | INTRODUCTION TO "LOS ANGELES" | ADDRESS DATA | DATA POINTER INFORMATION START CODE FOR REFERENCE TO OTHER ITEMS (1F68) |
| 93 — DATA POINTER INFORMATION START CODE FOR REFERENCE TO OTHER ITEMS (1F42) | ICON INDICATING POSITION | INTRODUCTION TO "SAN FRANCISCO" | ADDRESS DATA | DATA POINTER INFORMATION START CODE FOR REFERENCE TO OTHER ITEMS (1F68) |
| 94 — DATA POINTER INFORMATION START CODE FOR REFERENCE TO OTHER ITEMS (1F42) | ICON INDICATING POSITION | INTRODUCTION TO "NEW YORK" | ADDRESS DATA | DATA POINTER INFORMATION END CODE FOR REFERENCE TO OTHER ITEMS (1F68) |
| — | — | — | — | — |
| 95 — DATA POINTER INFORMATION START CODE FOR REFERENCE TO OTHER ITEMS (1F42) | ICON INDICATING POSITION | INTRODUCTION TO "WASHINGTON" | ADDRESS DATA | DATA POINTER INFORMATION END CODE FOR REFERENCE TO OTHER ITEMS (1F68) |
| DATA GROUP CONTROL BLOCK END CODE (1F65) | | | | |

CD-ROM XA DATA DISC FEATURING DISPLAY POSITION DATA RECORDED THEREON

This is a continuation of application Ser. No. 07/794,935 filed on Nov. 21, 1991, abandoned.

BACKGROUND OF THE INVENTION

1. Field of the Invention

This invention relates to a data disc advantageously used in a data reproducing apparatus or the like for reproducing data recorded on e.g. a data disc, and the method for retrieving data recorded on the data disc.

2. Description of the Prior Art

Recently, a so-called CD-ROM has become popular.

On the CD-ROM, any information that may be converted into digital data, such as letter or text data, image or picture data or voice data, may be recorded. However, it, is mainly the letter data that are recorded on the CD-ROM currently in use.

One of the reasons therefor is that evolution of computers has been centered around letters or text and the CD-ROM has been regarded as one of the peripheral devices of the computers.

Another reason is that standards for the CD-ROM, or so-called yellow book, have prescribed only physical formats for data to be recorded without prescribing logical formats or data specifications.

That, is, under the situation that large capacity external storage devices have been developed for computers which have been evolved around the letters or text as the center, only formats for data recording areas have been prescribed as standards.

In keeping with the users' recent audio-visual oriented preference, the users' demand is directed more and more towards image and sound, instead of letters or text. In other words, a demand is raised towards a so-called multi-media system.

Among the systems satisfying such users' demands, there are a so-called CD-I and CD-ROM XA.

Since the CD-I prescribes formats for data such as voice-, letter- and map data and operations of the operating system (OS) of the reproducing systems and central processing systems (CPUs), the retrieving methods have been unified to enable unified reciprocal retrieval among the voice-, letter- and map data.

However, this CD-I is not satisfactory in practical use because of the delay in propagation of the reproducing apparatus for CD-I or difficulties met in developing software systems.

Another system satisfying the above user's demand is the so-called CD-ROM XA.

FIG. 1 shows a format for this CD-ROM XA.

In FIG. 1, the CD-ROM XA only prescribes interleaved adaptive differential pulse code modulation (ADPCM) audio specifications and data recording may be made at levels B and C for up to eight hours (monaural) and sixteen hours (monaural), respectively.

With the data recording at the level B, the sound quality is of the order of that of FM broadcasting which is slightly inferior to the sound quality achieved with recording by CD-DA but is practically acceptable. With the data recording at the level C, the sound quality is of the order of that of AM broadcasting, but is similarly practically acceptable insofar as it is used for narration or the like purposes.

The interleaved ADPCM audio, which is of a so-called real-time file construction, enables real-time or concurrent reproduction of voice data with other data (inclusive of other voice data besides letter and map data).

Although the conventional CD-ROM prescribes formats for the PCM audio data, these PCM audio data cannot be interleaved and hence are recorded on separate tracks, thus rendering it difficult to reproduce other data, such as the PCM audio data, letter or text data or map data, on the real time basis.

FIG. 2 shows a typical construction of such real time file.

That is, in FIG. 2, with the level B stereo mode, voice data are arrayed at every four sectors, while letter or text data, map data or other voice data are arrayed in the intervening sectors.

With the level C stereo mode, voice data are arrayed at every eight sectors and letter or text data, map data or other voice data are arrayed in the intervening sectors.

In this manner, voice data may be reproduced concurrently with letter or text data, map data and other voice data.

However, even with the CD-ROM XA, which allows for concurrent reproduction of voice data, letter data and map data, since only the recording format for audio data is prescribed, as mentioned previously, recording formats for the letter data or map data will vary from one disc producer to another. Thus the program for data retrieval needs to be developed uniquely by the data disc producer and hence the retrieval methods differ from one data disc to another. Thus the user has to purchase a software article for each data disc at elevated costs while having to acquire the method of operating each retrieval software article by painstaking efforts. This also has impeded propagation of the data discs and retrieval equipment.

On the side of the producers, development of a retrieval software article for each of the data discs results in elevated costs for personnel and development and in increased development time, which in turn lead to elevated costs of the data discs and reproducing apparatus.

OBJECTS AND SUMMARY OF THE INVENTION

It is therefore an object of the present invention to provide a data disc enabling reciprocal retrieval among letter data, image data and voice data.

It is another object of the present invention to provide a method for data retrieval whereby the recording formats for the data discs may be unified.

In view of these objects, the present invention provides a data disc on which there are recorded main text data including image data for displaying a picture, image data pointer information, item data for retrieving the main text data, display position data indicating the display position of the item data on a display screen, and address data for reading out data corresponding to different items. The present invention also provides a method for data retrieval whereby a data disc on which there are recorded main text data including image data for displaying a picture, image data pointer information, item data for retrieving the main text data, display position data indicating the display position of the item data on a display screen, and address data for reading out data corresponding to different items is reproduced so that the image data are read out at the same time that the item data are displayed in superimposition on the display screen at a position indicated by the display position data of the read-out image data and output data corresponding to the item data are read out from the main text data on the basis of the address data.

BRIEF DESCRIPTION OF THE DRAWINGS

FIG. 1 is a diagrammatic view for illustrating recording formats for different levels off CD-ROM XA.

FIG. 2 is a diagrammatic view for illustrating a recording format for a real time file.

FIG. 4 is a diagrammatic view for illustrating the construction of data for map reproduction.

FIG. 5 is a diagrammatic view for illustrating the construction of map control tables recorded according to reproduction identification numbers of the data for map reproduction.

FIGS. 6, 7A and 7B are diagrammatic view for illustrating a bit image.

FIG. 8 is a diagrammatic view for illustrating an alternative construction of a data group control block.

FIGS. 10 and 11 are diagrammatic views for illustrating the construction of data group control blocks for illustrating the retrieval operation in accordance with selected items.

DETAILED DESCRIPTION OF PREFERRED EMBODIMENTS

Figure 3:
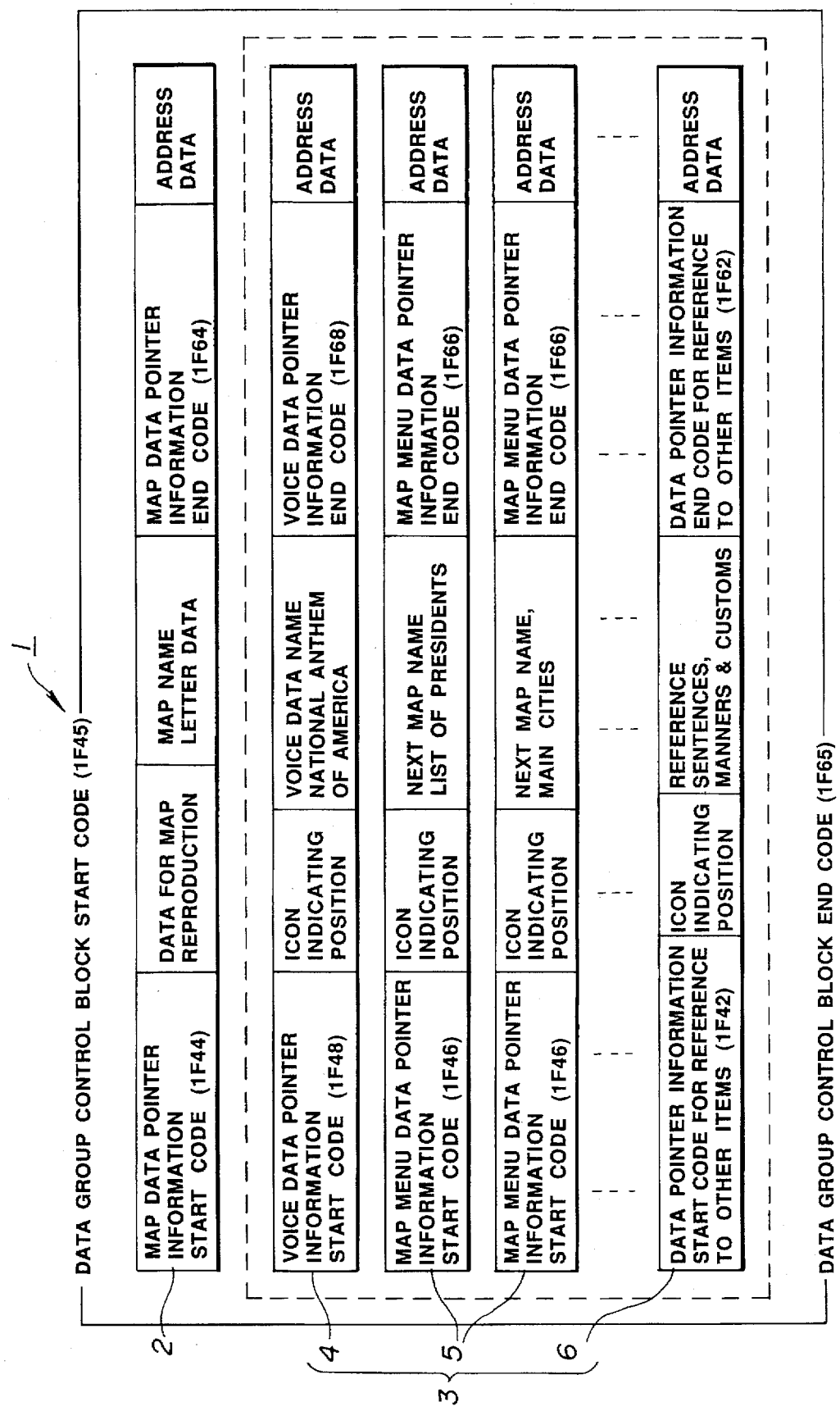
FIG. 3 is a diagrammatic view for illustrating a data group control block of a data disc according to the present invention.

Referring to the drawings, certain preferred embodiments of the data disc and the method for data retrieval according to the present invention will be explained in detail.

Figure 12:
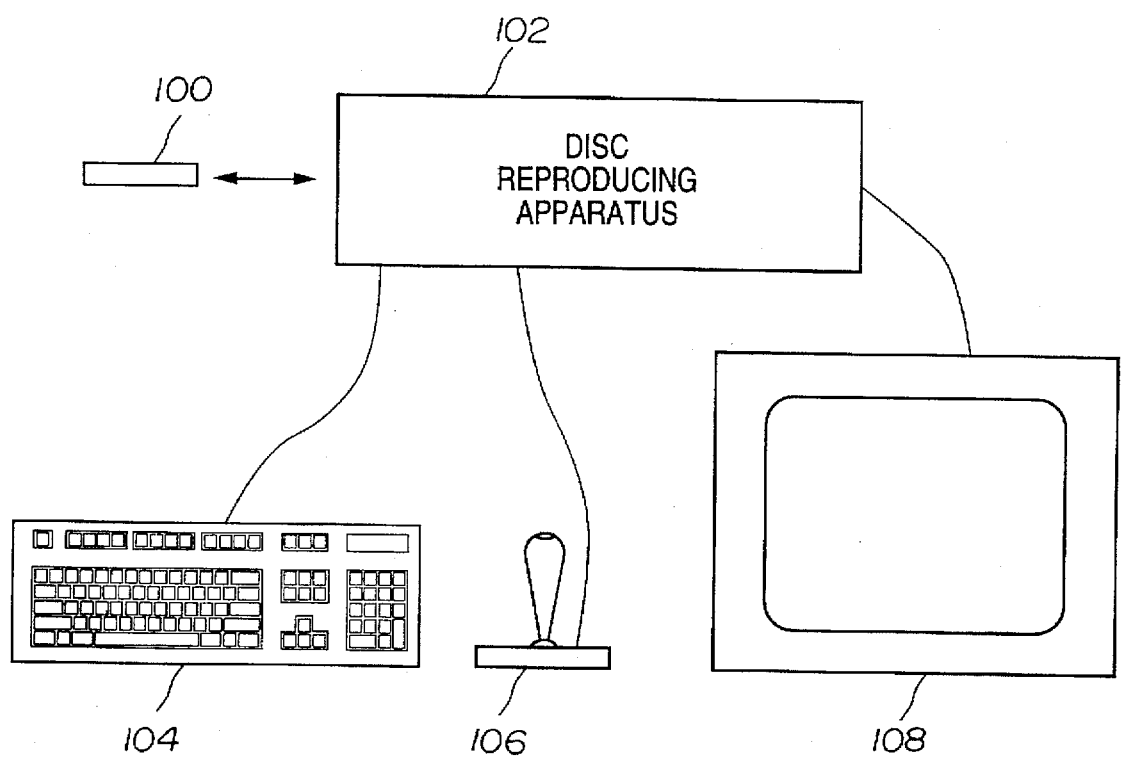
FIG. 12 is a block diagram of a reproducing apparatus for the data disc according to the present invention.

In the present embodiment, the data disc 100 (as shown in FIG. 12) employed is a so-called CD-ROM XA First Release, referred to hereinafter as CD-ROM XA, the letter data and map data are recorded with the level B monaural mode, and voice data are recorded with the level B stereo mode.

The present data disc 100 is provided with a plurality of data group control blocks as shown in FIG. 3 and a plurality of data group control blocks as shown in FIG. 8.

The data group control block 1 shown in FIG. 3 is used when reference is to be had from one map data to another map data, sentence data or voice data, while the data group control block 60 shown in FIG. 8 is used when reference is to be had from sentence data to map data or voice data.

The data group control block 1, shown in FIG. 3, employed when reference is had from one map data to another map data, sentence data or voice data, includes, between a code IF45 indicating the start of the block 1 and a code IF 65 indicating the end of the block 1, map data pointer information 2 as pointer information for the map data, and item data for retrieval 3.

The map data pointer information 2 is made up of a map data pointer information start code or identifier IF44, indicating the start of the map data pointer information 2, data for map reproduction, letter data indicating a map name of the map data by letters, a map data pointer information end code or identifier IF64 indicating the end of the map data pointer information 2 and address data indicating the leading address in the main text data in which the map data are recorded.

Referring to FIG. 4, the data for map reproduction includes a plurality of reproduction identification numbers 21 and numbers 22 and 23 indicating the numbers of vertical and transverse dots, respectively, of an image displayed by the map data.

The reproduction identification numbers 21 are identification numbers which are stored in a map control table as later described and which are appended to respective detailed pieces of information concerning map reproduction.

FIG. 5 shows a data construction of the map control table.

In FIG. 5, there are stored, in the map control table 30, "data type", "compression method", "vertical screen size", "transverse screen size", "vertical resolution", "transverse resolution" and "reserve", for each of the reproduction identification numbers 31.

In the recording area for "data type", the format for map data is recorded so that, for example, "0X00" represents an image having two values and "0X01" represents an image having more than two values (reserve).

In the recording area for "compression methods", there are recorded data compression methods, so that, for example, "0X00", "0X01", "0X02" and "0X03" represent non-compression, simple run length, MH compression and MR compression, respectively.

In the recording area for "longitudinal screen size", there is recorded the longitudinal dot size of an output device, assumed to be used, which is "0" for a printer.

In the recording area for "transverse screen size", there is recorded the transverse dot size of an output device, assumed to be used, which is "0" for a printer.

In the recording area for "longitudinal resolution", there is recorded a longitudinal resolution of an assumed output device.

In the recording area for "transverse resolution", there is recorded a transverse resolution of an assumed output device.

The recording area for "reserve" is a recording area provided for recording data to be added in the future and no data are recorded at the present stage. It is noted that "X" may be "0" or "1" and the number of entries 32 indicates the number of the recorded reproduction identification numbers.

In the above described map control table, data of the first one of the recorded reproduction identification numbers, or the "reproduction identification number 1", include data type of "0X00", compression method of "0X00", longitudinal screen size of "0X0200" and transverse screen size of "0X0256". At least one of the reproduction identification numbers is provided in the data for map reproduction of the map data pointer information 2.

The larger the number of the recorded reproduction identification numbers, the more is the number of the types of the reproducing apparatus that may be coped with.

It is under this format that the picture by the map data inclusive of item data as later explained is displayed. The following is the form of expression (image) of the picture.

FIG. 6 shows each line of the bit map image data.

In FIG. 6, each line of the image data, when viewed as a byte row, has an increasingly higher address towards right and a line lying at lower positions bears higher addresses.

If the bit map image data are expressed by, for example, 8-bit data, the leftmost bit represents the most significant bit (MSB). That is, if the 0'th bit, the first bit and the fourth bit are "1" (13h), as shown in FIG. 7A, a picture is displayed in the order of black, black, white, white, black, white, white and white. Similarly, if the 0'th bit and the fourth to seventh bits are "1" (F1H), as shown in FIG. 7B, a picture is displayed in the order of black, white, white, white, black, black, black and black.

In the present embodiment, the MH or MR coding methods are used for coding the bit map image.

During reproduction, each reproducing apparatus consults the above described map control table for selecting data of the optimum reproduction identification number for reproduction. The reproduction identification numbers determine the size of the displayed image, whilst the numbers of longitudinal and transverse dots determine the size of the image displayed on the display screen.

In the present embodiment, the size of the display screen on the hardware side is adapted to coincide with the size of the image corresponding to the map data for display.

If, for displaying the map data, the size of the image is larger than the size of the display screen, the picture may be transiently stored in a memory for subsequent display of each portion of the picture by using the so-called scrolling function.

Also, if the size of the display screen is larger than the picture size, the picture may be displayed at a predetermined position of the display screen and a description such as a legend for the picture may be displayed at other portion(s) of the screen. This is desirable in the case of a hardware of the type in which a display area of a display screen may be partitioned at the user's option.

The item data 3 shown in FIG. 3 include, for example, voice data pointer information 4, map menu data pointer information 5 and data pointer information for reference to the other items 6.

The voice data pointer information 4 is pointer information for designating the outputting of the voice data corresponding to the picture of the map data displayed on the display screen, and is made up of a voice data pointer information start code or identifier for indicating the start of the voice data IF48, icon display position data, which is the position data indicating a display position, recorded by XY coordinates, of an icon used for selecting the voice data pointer information, the name of voice data (letter data) outputted on selection of the voice data pointer information, a voice data pointer information end code or identifier IF 68 indicating the end of the voice data pointer information 4 and address data indicating the leading address in the main text data in which the voice data are recorded.

The position indicating the icon is recorded by, for example, four bytes, of which the first and second bytes indicate the position on the X-axis and the third and fourth bytes indicate that on the y-axis. The manner of recording of the indicating position by the icon is the same in the case of the map menu data pointer information 5 and the data pointer information for reference to other items as later described.

With the above described embodiment, the voice data are recorded as interleaved ADPCM audio data between the map data in the main text data. Meanwhile, a bit "End of Record" indicating the recording end position of voice data is set at a submode of the last sector of each voice data.

When the voice data are recorded in accordance with the so-called CD-DA format, the code of the voice data pointer information start identifier and that for the voice data pointer information end identifier are "IF47" and "IF67", respectively.

The address data are made up of a track number, a leading address and an end address. In the present embodiment, the track number is the track number of the CD-DA and a code "0002" indicating the second track having a fixed value is recorded as an example. The leading address is recorded by a relative block number of the leading address for which voice data are recorded while the end address is recorded by the relative block number from the leading end of the track.

The map menu data pointer information 5 is pointer data indicating another picture which is to be referred to from the currently displayed picture for display. The information 5 is made up of a map menu data start identifier IF46 indicating the start of the information 5, icon display position data which are the position data indicating the display position, recorded by XY coordinates, of the icon used for selecting the information 5, letter data for displaying the name of data of the information 5 by letters, a map menu data end identifier IF66 indicating the end of the information 5 and address data indicting the leading end of the address for which there is recorded a data group control block other than the data group control block in which the information 5 is recorded.

The data pointer information for reference to other items 6 is the pointer information which references to new sentence data from the sentence or map data in the display picture. The information 6 is made up of a data pointer information start identifier for reference to other items IF42 indicating the start of the information 6, icon display position data which is the position data, recorded by the XY coordinates, of an icon used for selecting the information 6, letter data for indicating the name of the sentence of reference of the information 6, a data point information end identifier for reference to other items IF62 indicating the end of the information 6, and address data of the leading address in the main text data in which the information 6 is recorded.

The above explanation has been given of the data group control block 1 used for having reference from map data to other map data, sentence data or voice data. A data group control block used when having reference from the sentence data to the map data or voice data is hereinafter explained by referring to FIG. 8.

In this figure, the data group control block 60 is delimited by a data group control block start identifier IF45 and a data group control block end identifier IF65, similarly to the data group control block 1. The block 60, however, is not provided with information corresponding to the map data pointer information 2 of the data group control block 1 but instead is provided with a map menu data pointer information, voice data pointer information and data pointer information for having reference to other items. It is noted that the respective data are demarcated by a lone feed code IF0A.

The construction of the above data is the same as that of the above described data group control block 1 so that description therefor is omitted for simplicity.

With what may be termed a block construction in which each data is delimited by the data group control block start identifier and by the data group control block end identifier, it becomes difficult to reproduce letter data exclusively. Such difficulty may be avoided by placing letter data outside the block delimited by the data group control block start identifier and the data group control block end identifier.

By taking a specific example, the data retrieval method of the present invention employing such a data disc is hereinafter explained.

It is assumed that the data disc is entitled "Guide to United States of America" in which there are recorded data for introducing the history and geography of the United States.

This data disc is what may be termed a multi-medium disc 100, capable of being reproduced by a data disc reproducing apparatus 102 for displaying and outputting pictures (illustrations and atlases) on a display screen 108, voice (narration and environmental or background sounds) or sentences (description), as shown in FIG. 12.

When the data disc 100 is loaded in the data disc reproducing apparatus 102 which is then commanded for reproduction, the reproducing apparatus 102 reads out menu data from the main text data, in accordance with address data of the map data pointer information 2 of the data group control block 1 shown in FIG. 3, while reading and reproducing letter data as a map name of the displayed picture, letter data of respective items of retrievable item data 3 and display position data of the icon used for selecting the item data.

Figure 9B:
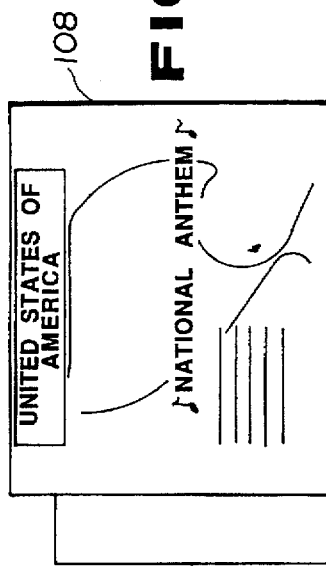
FIGS. 9a to d are schematic views showing specific examples of the data retrieval method according to the present invention.
Figure 9C:
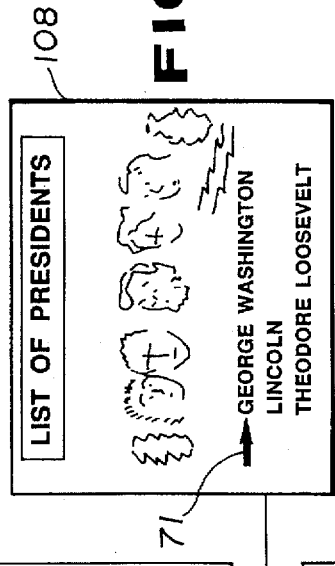
Figure 9D:
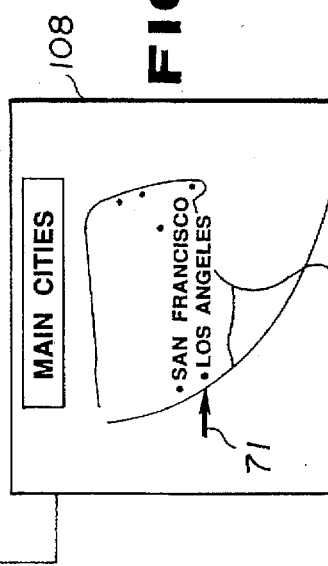
Figure 9A:
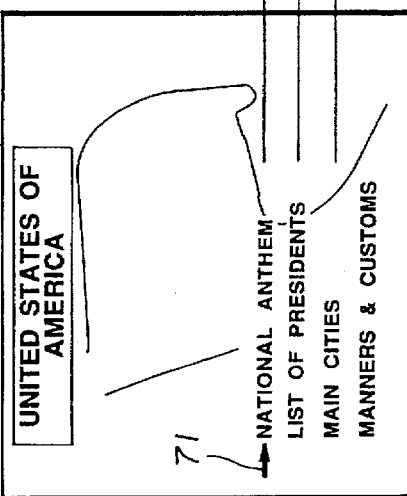

In this manner, an illustration of an atlas of the United States as shown in FIG. 9a is displayed on the overall display screen, at the same time that the legend United States of America as a map name as well as the legend "National Anthem of America", "List of Presidents", "Main Cities", and "Manners & Customs", as the names of the retrievable items, and an arrow-shaped icon 71, are displayed as an initial image.

The icon 71 is operated by the user by means of a keyboard 104 or a mouse 106 or the like.

If, for example, the "National Anthem" is selected from the retrieval items shown in FIG. 9a, the icon 71 is moved to indicate the legend "National Anthem of America", If this legend is designated in this manner, the reproducing apparatus reads out voice data from the addresses of the main text data designated by address data of the voice data pointer information 4 shown in FIG. 3, while causing the legend "National Anthem" to be displayed at the center of the display screen.

Thus the national anthem of the United States is played from a speaker or the like. The text of the anthem may be displayed simultaneously.

If then the user operates the icon 71 shown in FIG. 9a to select the item "List of Presidents", the reproducing apparatus proceeds to reproducing the data group control block designated by the address data of the map menu pointer information 5 shown in FIG. 3.

Figure 10:
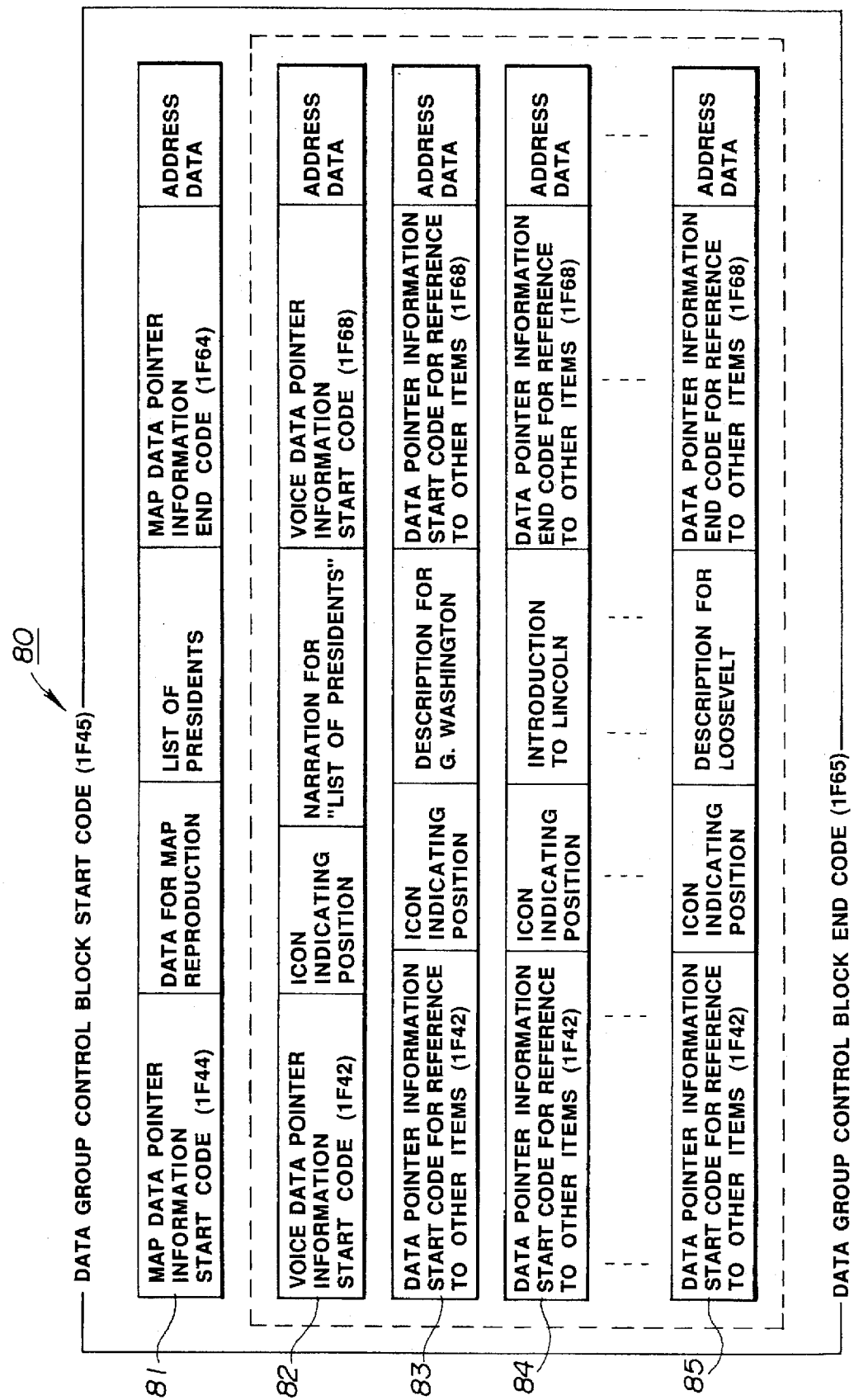

The construction of the data group control block is shown in FIG. 10.

In this figure, the data group control block 80 is made up of a menu data pointer information corresponding to the selected list of presidents 81, voice data pointer information 82 outputting the narration for the list of the presidents by voice, and data pointer information for having reference to other items 83 to 85 for having reference to legend for summarizing the profiles of the presidents, for example, George Washington or Theodore Roosevelt.

The reproducing apparatus proceeds to reproducing the data group control block 80 to reproduce main text data designated by the address data of the map data pointer information 81 corresponding to the list of presidents, while outputting the main text data designated by the letter data of the item names of the item data 82 to 85 and simultaneously causing the letters of the presidents' names to be displayed at the upper area of the display screen. In this manner, there are displayed, by illustration, stone sculptures of the faces of the President George Washington, President Lincoln and President Roosevelt, on Mt. Rushmore of America, as shown in FIG. 9c. Simultaneously, the letters of "George Washington", "Lincoln" and "Roosevelt" are displayed along with the icon 71, so that reference may be had to the profiles of these presidents.

If, from the retrievable items displayed on the screen 108, "Lincoln", for example, is selected, the reproducing apparatus reads out the description, such as the profile of "Lincoln" from the address of the main text data indicated by the address data of the data pointer information for reference to other items 84 for display on the entire screen surface.

If then the user operates the icon 71 shown in FIG. 9a to select the item "Main Cities", the reproducing apparatus proceeds to reproduce the data group control block designated by the address data of the map menu data 5 shown in FIG. 3.

The construction of the data group control block is shown in FIG. 11.

In this figure, the data group control block 90 is made up of a map data pointer information 91 in which there are recorded a leading address in the main text data in which map data for visual display of the main cities of America are recorded, and data pointer information for having reference to other items 92 to 95 for having reference to the description of the main cities, such as Los Angeles, San Francisco, New York and Washington.

The reproducing apparatus 102 proceeds to reproduce the data group control block 90 to reproduce the main text data designated by the map data pointer information 91 corresponding to the "Main Cities" to output the letter data of the item names of the item data 92 to 95 for reproduction, while causing the legend "Main Cities" to be displayed at an upper area of the display screen.

In this manner, there are displayed, on the display screen, an atlas of the United States, by illustration, as well as the geographical locations and names of the main cities by black circles, as shown in FIG. 9d.

If, from the main cities, indicated by the black circles, Los Angeles, for example, is selected, the description for "Los Angeles" is read from the address of the main text data shown in the address data of the data pointer information for reference to other items 92 for display on the entire screen surface 108.

If then the user operates the icon 71 shown in FIG. 9a to select the item "Manners & Customs", the reproducing apparatus 102 proceeds to reproduce the address group control block bearing the address designated by the address data of the information for reference to other items 6 shown in FIG. 3.

Although not shown, there is recorded in the data group control block 1 a leading address of the main text data including the description for the "Manners & Customs". The reproducing apparatus 102 reads out and outputs the sentence data corresponding to the "Manners & Customs" from the address of the main text data indicated by the leading address, while causing the legend "Manners & Customs" to be displayed at the upper side of the screen surface.

In this manner, the legend "Customs and Manners of America" is displayed at the upper area of the display screen surface 108, while letter data introducing the "Manners & Customs" is displayed on the entire screen surface 108.

It will be seen from above that, with the data disc and the retrieval method for retrieving data recorded thereon, according to the present invention, the map data pointer information 2 as a pointer data indicating the leading address of the main text data in which the currently displayed picture data are stored, and the item data 3 indicating the retrievable items, are recorded in a block delimited between the data group control block start identifier IF45 and the data group control block end identifier IF65, and each item data has an address for the corresponding data group control block, in such a manner as to enable map data, voice data and sentence data to be retrieved reciprocally.

By virtue of the unified data recording format and data retrieving method, it becomes possible to dispense with the labor of developing programs of the retrieving methods for each software article to lower production costs. In addition, since the user is not required to learn the retrieving method for each software article, the user who has once acquired the retrieval method may cope with a plurality of different software articles.

Besides, general-purpose properties of the software and reproducing apparatus may be improved by unifying the data construction and the retrieval method.

Although the terms "map data" and "voice data" have been used throughout this specification, it will be understood that these terms refer generally to image data, e.g. maps, pictures, etc., and audio data, e.g., voice narration, music, etc., respectively.

What is claimed is:

1. An optical disc for enabling reciprocal retrieval by an optical disc reproducing apparatus, the optical disc having digitally recorded thereon main text data composed of text data, image data, and audio data in a CD-ROM XA format and management data, said management data at least including image data pointer information for representing an image to be displayed by the optical disc reproducing apparatus, item data for designating and retrieving the main text data, display position data for representing a display position for the item data on a display screen of a display means of the optical disc reproducing apparatus, and address data for representing and reading out the main text data, corresponding to the item data, read out and displayed on the display means.

2. The optical disc as claimed in claim 1 wherein the image data pointer information and the item data constitute a data control block and are digitally recorded on the optical disc between a digitally recorded code indicating a start of the data control block and a digitally recorded code indicating an end of the data control block.

3. The optical disc as claimed in claim 1 wherein the image data pointer information includes an image data pointer information start identifier indicating a start of the image data pointer information, data for image reproduction, data for indicating an image name of the image data, an image data pointer end identifier indicating an end of the image data pointer information, and address data indicating a leading address of the main text data in which the image data is digitally recorded.

4. The optical disc as claimed in claim 1 wherein the item data includes at least audio data pointer information.

5. The optical disc as claimed in claim 4 wherein the audio data pointer information includes an audio data pointer information start identifier indicating a start of the audio data pointer information, position data indicating a display position of a selector for selecting the audio data pointer information, an audio data pointer information end identifier indicating an end of the audio data pointer information, and address data indicating a leading address of the main text data including the audio data.

6. The optical disc as claimed in claim 5 wherein the audio data pointer information includes audio data name data to be outputted upon selection of the audio data pointer information.

7. The optical disc as claimed in claim 5 wherein the address data includes a track number, a leading address and an end address.

8. The optical disc as claimed in claim 4 wherein the item data further includes image menu data pointer information.

9. The optical disc as claimed in claim 8 wherein the image menu data pointer information includes an image menu data pointer information start identifier indicating a start of the image menu data pointer information, position data indicating a display position on the display means of a selector for selecting the image menu data pointer information, an image menu data pointer information end identifier indicating an end of image menu data pointer information, and address data indicating a leading address of addresses for data group control blocks other than the data group control block in which the image menu data pointer information is stored.

10. The optical disc as claimed in claim 9 wherein the image menu data pointer information further includes image menu data name data to be outputted by the optical disc reproducing apparatus upon selection of the image menu data pointer information.

11. The optical disc as claimed in claim 4 wherein the item data further includes data pointer information for having reference to other item data.

12. The optical disc as claimed in claim 11 wherein the data pointer information for reference to other item data includes a data pointer information start identifier for reference to other items indicating a start of data pointer information for having reference to other item data, position data indicating a display position of a selector for selecting the data pointer information for having reference to other item dam, a data pointer information end identifier for reference to other item data indicating an end of the data pointer information for having reference to other item data, and address information indicating a leading address of the main text data in which display data for displaying by the display means names of reference sentences of data pointer information for having reference to other item data and reference data of the other item data is digitally recorded.

13. The optical disc as recited in claim 1, wherein the audio data is digitally recorded as interleaved adaptive differential pulse code modulated data between the image data in the main text data.

14. A data retrieval method for an optical disc, the optical disc being digitally recorded with main text data composed of text data, image data and audio data in a CD-ROM XA format and management data, the management data at least including image data pointer information for representing the image data for displaying a picture on a display screen, item data for designating and retrieving the main text data, display position data for representing a display position of the item data on the display screen and address data for representing and reading out the main text data corresponding to the designated item data, the method comprising the steps of:

reading out the management data from the optical disc;

reading out and displaying the image data from the main text data according to the image data pointer information;

reading out and displaying the item data on the display screen at a position indicated by the display position data, and reading and outputting one of the text data, the image data, and the audio data of the main text data according to the designated item data.

15. The method for data retrieval as claimed in claim 14 wherein item names of the item data are displayed on the display screen based on the designated item data.

16. An information retrieval and display system for allowing reciprocal retrieval of text digital data, image digital data and audio digital data comprising:

an optical disc, the optical disc being digitally recorded with main text data composed of text data, image data and audio data in a CD-ROM XA format and management data, the management data at least including image data pointer information for representing the image data for displaying a picture on a display screen, item data for designating and retrieving the main text data, display position data for representing a display position of the item data on the display screen and address data for representing and reading out the main text data corresponding to the designated item data; and a data disc reproducing apparatus including a display screen and means for reading out the management data from the optical disc, means for reading out and displaying the image data from the main text data according to the image data pointer information, means for reading out and displaying the item data on the display screen at a position indicated by the display position data, and means for reading and outputting one of the text data, the image data, and the audio data of the main text data according to the designated item data.

17. The information retrieval and display system as claimed in claim 16 wherein the image data pointer information and the item data constitute a data control block and are digitally recorded on the optical disc between a digitally recorded code indicating a start of the data control block and a digitally recorded code indicating an end of the data control block.

18. The information retrieval and display system as claimed in claim 16 wherein the image data pointer information includes an image data pointer information start identifier indicating a start of the image data pointer information, image digital data for image reproduction, data for indicating an image name of the image digital data, an image data pointer information end identifier indicating an end of the image data pointer information, and address data indicating a leading address of the main text data in which the image digital data is digitally recorded.

19. The information retrieval and display system as claimed in claim 16 wherein the item data includes at least audio data pointer information.

20. The information retrieval and display system as claimed in claim 19 wherein the audio data pointer information includes an audio data pointer information start identifier indicating a start of the audio digital data pointer information, position data indicating a display position of a selector for selecting the audio data pointer information, an audio data pointer information end identifier indicating an end of the audio data pointer information, and address data indicating a leading address of the main text data including the audio digital data.

21. The information retrieval and display system as claimed in claim 20 wherein the audio data pointer information includes name data for the audio digital data to be outputted upon selection of the audio data pointer information.

22. The information retrieval and display system as claimed in claim 20 wherein the address data includes a track number, a leading address and an end address.

23. The information retrieval and display system as claimed in claim 19 wherein the item data further includes image menu data pointer information.

24. The information retrieval and display system as claimed in claim 23 wherein the image menu data pointer information includes an image menu data pointer information start identifier indicating a start of image menu data pointer information, position data indicating a display position of a selector for selecting the image menu data pointer information, an image menu data pointer information end identifier indicating an end of image menu data pointer information, and address data indicating a leading address of addresses for data group control blocks other than the data group control block in which the image menu data pointer information is stored.

25. The information retrieval and display system as claimed in claim 24 wherein the image menu data pointer information further includes name data for image menu data to be outputted upon selection of the image menu data pointer information.

26. The information retrieval and display system as claimed in claim 19 wherein the item data further includes data pointer information for having reference to other item data.

27. The information retrieval and display system as claimed in claim 26 wherein the data pointer information for having reference to the other item data includes a data pointer information for having reference to an other item data start identifier indicating a start of data pointer information for having reference to the other item data, position data indicating a display position of a selector for selecting the data pointer information for having reference to the other item data, a data pointer information for having reference to an other item data end identifier indicating an end of the data pointer information for having reference to the other item data, and address information indicating a leading address of the main text data in which display data displaying the name of reference sentences of the data pointer information for having reference to the other item data and reference data of the other item data are digitally recorded.

* * * * *

UNITED STATES PATENT AND TRADEMARK OFFICE
CERTIFICATE OF CORRECTION

PATENT NO. : 5,675,783
DATED : October 7, 1997
INVENTOR(S) : NORIMASA SASAKI

It is certified that error appears in the above-identified patent and that said Letters Patent is hereby corrected as shown below:

In Col. 10, line 30, "dam" should be --data--.

Signed and Sealed this

Twentieth Day of January, 1998

Attest:

BRUCE LEHMAN

*Attesting Officer*       *Commissioner of Patents and Trademarks*